Patented Feb. 10, 1925.

1,526,032

UNITED STATES PATENT OFFICE.

JOHN A. WESENER, OF CHICAGO, ILLINOIS.

ALIMENTARY PRODUCT.

No Drawing. Application filed September 16, 1921. Serial No. 501,149.

*To all whom it may concern:*

Be it known that I, JOHN A. WESENER, a citizen of the United States, residing at Chicago, in the county of Cook and State of Illinois, have invented certain new and useful Improvements in Alimentary Products, of which the following is a specification.

My invention relates to an alimentary product containing soluble substances derived from Indian corn or other grain or grain offal or bran combined with certain other ingredients, as hereinafter set forth, which product may be used medicinally or as a condiment for or component part of foods for human or animal diet for the purpose of activating or aiding the digestion and increasing the nutritive value of the food with which it is used; or which may be employed as a yeast food either in the baking industry where it may be mixed with the flour or dough, or in the manufacture of yeast.

The primary objects of the invention are to provide a novel alimentary product having the qualities and utilities above mentioned, more especially a product or products in dry form and non-hygroscopic, and to provide certain new methods and operations for economically manufacturing such product or products.

The product of my invention, when destined for use for dietary purposes, is preferably made by mixing the soluble substances extracted from maize or other grain or grain offal or bran, with a suitable dehydrant and neutralizer, preferably a phosphate compound, to which may be added if desired a material rich in substances commonly referred to as vitamines, such, for example, as common yeast or autolyzed yeast, with preferably, though not necessarily, a small amount of iron in the form of ferric chloride, and thereupon reducing the mixture to a dry state, preferably by evaporation in a vacuum drier.

To give a specific example, I take steep water obtained, for instance, from the steeping of corn in the manufacture of starch, containing 15 to 18 pounds of solid matter and having a concentration of from 55 to 58%, and mix with it compressed yeast containing approximately 5.8 pounds of solids and having a concentration of 13%, 15 pounds of tricalcium phosphate and two ounces of ferric chlorid. Instead of common yeast it is possible to use an equivalent amount of autolyzed yeast. Dicalcium phosphate may be used in place of the tricalcium phosphate or it will be possible to use calcium sulphate or calcium carbonate although these dehydrants do not add to the dietetic value of the product. If the mixture is too thick for handling water may be added. The mixture is then evaporated at a temperature sufficiently low to prevent the yeast from being detrimentally affected, for example, at from 100° Fahrenheit to 140° Fahrenheit.

The product will be in the form of a dry, non-hygroscopic substance which may be pulverized or pressed into cakes or tablets. It will not be hygroscopic or deliquescent. Efforts have been made to reduce steep water in the starch industry to the form of a powder which will remain dry, but so far as I am aware, such efforts have not proven successful. The material rapidly takes on water if exposed to the atmosphere and becomes sticky and syrupy. The product of this invention is to all intents and purposes non-hygroscopic. The steep water contains protein matter, organic phosphorous in the form of phytic acid, inorganic phosphates and other substances of dietetic value, but it lacks the bodies or organisms known as vitamines (none being found in corn or other grain) which are essential for a properly balanced food. The vitamines are supplied in the product of my invention as destined for human consumption by the yeast. The use of tricalcium phosphate or dicalcium phosphate as dehydrants improves the dietary value of the product besides preventing hygroscopicity. It acts chemically upon the hygroscopic substances in the extractives of the cereal, that is to say upon the free phosphoric and lactic acids of the steep water changing these acids which pick up water very freely into non-hygroscopic salts. The tricalcium phosphate (the same is true of calcium sulphate and calcium carbonate) is a dehydrant in the strict chemical sense of the term. These substances are not mere physical absorbents. Their action is chemical. They neutralize the acids of the grain extract which are by nature hygroscopic, changing them into salts which have little or no affinity for water and thus make it possible to evaporate the extract to a powder which will remain dry. The excess of tricalcium phosphate over that used for neutralization acts as an absorbent of moisture. The steep water will contain a small amount of iron from the corn but it is desirable, although not necessary, to increase the iron content. This is done by adding ferric chloride as stated. The iron from the ferric chloride combines with the split proteins forming readily assimilable albuminates of iron.

If the product is to be used as a yeast food in the manufacture of yeast or if for other reasons yeast in the product is not desired the yeast component as above described may be omitted. By "grain" as used in the claims I intend to cover bran or other grain offal or refuse.

I claim:

1. Extracted solubles of grain in a dry state containing the acids of the grain neutralized as non-hygroscopic salts and iron in chemical combination with the protein substances of the grain.

2. Extracted solubles of grain in a dry state containing a dehydrant and neutralizing agent combined in part with the acids of the grain to form non-hygroscopic salts.

3. Extracted solubles of grain in a dry state containing a calcium salt in chemical combination with the acids of the grain.

4. Extracted solubles of grain in a dry state containing a calcium phosphate in chemical combination with the acids of the grain.

5. Extracted solubles of grain in a dry state containing a calcium phosphate in chemical combination with the acids of the grain, and iron chemically combined with the protein substances of the grain.

6. Extracted solubles of grain in a dry state containing tricalcium phosphate in chemical combination with the acids of the grain.

7. Extracted solubles of grain in a dry state containing tricalcium phosphate in chemical combination with the acids of the grain and albuminate of iron.

8. Extracted solubles of grain in a dry state containing the acids of the grain neutralized as non-hygroscopic salts.

9. Extracted solubles of grain in a dry state containing the acids of the grain neutralized as non-hygroscopic salts and albuminate of iron.

10. Method of manufacturing the product of the foregoing claims which consists in extracting the solubles from the grain in a liquid state, mixing therewith a dehydrant and neutralizing agent to neutralize the hygroscopic acids of the extract, and evaporating the mixture.

11. Method of manufacturing the product of the foregoing claims which consists in extracting the solubles in a liquid state from the grain, mixing therewith a dehydrant and neutralizing agent to neutralize the hygroscopic acids of the extract and an iron compound capable of reacting with the split proteins of the grain to form albuminates of iron, and evaporating the mixture.

12. Method of manufacturing the product of the foregoing claims which consists in extracting the solubles in a liquid state from the grain, mixing therewith calcium phosphate and evaporating the mixture to produce a dry substance in which the hygroscopic acids of the extract are changed into non-hygroscopic salts.

13. Method of manufacturing the product of the foregoing claims which consists in extracting the solubles in a liquid state from the grain, mixing therewith calcium phosphate and ferric chloride and evaporating the mixture to produce a dry substance in which the hygroscopic acids of the extract are changed into non-hygroscopic salts and iron is chemically combined with the split proteins of the grain.

JOHN A. WESENER.